United States Patent
Megiddo et al.

(10) Patent No.: US 8,782,179 B2
(45) Date of Patent: Jul. 15, 2014

(54) COMMUNICATION WORKSPACE

(75) Inventors: Eran Megiddo, Bellevue, WA (US); Joshua T. Goodman, Redmond, WA (US); Jensen M. Harris, Bellevue, WA (US); Susan T. Dumais, Kirkland, WA (US); Michael V. Ehrenberg, Seattle, WA (US); Srikanth Shoroff, Sammamish, WA (US); William H. Gates, III, Medina, WA (US)

(73) Assignee: Microsoft Corporation, Redmond, WA (US)

( * ) Notice: Subject to any disclaimer, the term of this patent is extended or adjusted under 35 U.S.C. 154(b) by 881 days.

(21) Appl. No.: 12/098,027

(22) Filed: Apr. 4, 2008

(65) Prior Publication Data

US 2009/0254390 A1 Oct. 8, 2009

(51) Int. Cl.
*G06F 15/177* (2006.01)
*G06F 15/16* (2006.01)
*G06Q 10/00* (2012.01)

(52) U.S. Cl.
USPC .......... 709/220; 709/222; 709/205; 705/7.14; 705/7.23

(58) Field of Classification Search
USPC ................. 709/220; 705/7.14, 7.23
See application file for complete search history.

(56) References Cited

U.S. PATENT DOCUMENTS

| | | | |
|---|---|---|---|
| 6,385,619 B1 | 5/2002 | Eichstaedt et al. | |
| 6,484,155 B1 * | 11/2002 | Kiss et al. | 706/46 |
| 6,493,703 B1 * | 12/2002 | Knight et al. | 1/1 |
| 6,611,842 B1 | 8/2003 | Brown | |
| 6,701,362 B1 * | 3/2004 | Subramonian et al. | 709/224 |
| 7,765,166 B2 * | 7/2010 | Beringer et al. | 705/319 |
| 2002/0059369 A1 * | 5/2002 | Kern et al. | 709/203 |
| 2002/0133500 A1 * | 9/2002 | Arlein et al. | 707/102 |
| 2003/0041143 A1 | 2/2003 | Ronald et al. | |
| 2003/0154180 A1 * | 8/2003 | Case et al. | 707/1 |
| 2004/0098357 A1 * | 5/2004 | Higgins et al. | 706/45 |
| 2006/0026114 A1 * | 2/2006 | Gregoire et al. | 707/1 |
| 2006/0036456 A1 * | 2/2006 | Wu | 705/1 |
| 2006/0156326 A1 | 7/2006 | Goronzy et al. | |
| 2006/0173838 A1 | 8/2006 | Garg et al. | |

OTHER PUBLICATIONS

Ekle Michlmayr, et al. Learning User Profiles from Tagging Data and Leveraging them for Personal(ized) Information Access, WWW2007, May 8-12, 2007, Banff, Canada. http://www2007.org/workshops/paper_29.pdf. Last accessed Mar. 20, 2008, 7 pages.

(Continued)

*Primary Examiner* — Rupal Dharia
*Assistant Examiner* — Joe Chacko
(74) *Attorney, Agent, or Firm* — Dan Choi; Carole Boelitz; Micky Minhas

(57) ABSTRACT

Multiple pieces of information can be arranged into a single construct that allows the employee to ascertain information quickly while at her workstation. Selection of information for placement into the construct can employ various statistical models and the like. Selective pieces of information can be masked for a user's construct based upon access rights of the user. Constructs can be configured by a user based on personal preferences as well as by an administrator. Population of metadata upon the construct can be performed automatically through an instruction of the administrator or be overridden by a user request. In addition, various types of synchronization can be implemented between constructs, such that identical or near-identical information is populated upon multiple constructs.

20 Claims, 14 Drawing Sheets

(56) References Cited

OTHER PUBLICATIONS

Ekle Michlmayr, et al. Adaptive User Profiles for Enterprise Information Access, WWW2007 16th International World Wide Web Conference, May 8-12, 2007, Banff, Canada. http://www.hpl.hp.com/techreports/2007/HPL-2007-72.pdf. Last accessed Mar. 20, 2008, 11 pages.

Portable Personality http://sourceforge.net/projects/p-2/. Last accessed Mar. 20, 2008, 1 page.

Koen Hermans, et al. Automated User Profile Generation for Knowledge Management Systems ftp://ftp.esat.kuleuven.ac.be/pub/SISTA/demoor/reports/paper_KMAC2003_Koen_Hermans.doc. Last accessed Mar. 24, 2008, 11 pages.

* cited by examiner

COMMUNICATION WORKSPACE

TECHNICAL FIELD

The subject specification relates generally to computer organization and in particular to creating a workstation business profile.

BACKGROUND

Computer technology influences various aspects of communication, including secured communication, interpersonal communication, mass dissemination of information, etc. A variety of protection schemes can be implemented to increase security of information. For example, data can be encrypted in a manner that requires a key to unlock data. Without such key, it can be virtually impossible to access data, and breaking encryption can take countless hours.

Due to computer developments, new interpersonal communication mediums are available that allow individuals to engage in virtually instantaneous interaction. Electronic mail (e-mail) allows people to compose digital messages that are sent to at least one or more recipients. In addition to text, typical e-mail messages include pictures, videos, etc. Faster communication mediums allow for real-time interaction between different parties. For instance, instant messenger programs allow individuals to send rapid messages between one another as part of a single construct. Instant message sessions can integrate with other forms of technology; a user can engage a digital camera to supply live video to a recipient of an instant message communication.

Moreover, creating an entry log (commonly known as a 'web log' or 'blog') allows people to communicate a relatively large amount of information to a large number of respective people. Commonly, individuals make periodic updates upon their entry log that can be appreciated by other individuals. Many people create their own web pages that can be accessed by people online. In an illustrative example, a mother of a newborn child can post pictures on a personal online page. Various family members, or if she so chooses, complete strangers can view the pictures and send congratulatory messages.

SUMMARY

The following discloses a simplified summary of the specification in order to provide a basic understanding of some aspects of the specification. This summary is not an extensive overview of the specification. It is intended to neither identify key or critical elements of the specification nor delineate the scope of the specification. Its sole purpose is to disclose some concepts of the specification in a simplified form as a prelude to the more detailed description that is disclosed later.

Conventionally, social networking architecture allows individuals to provide various amounts of information to other people. Friend relationships can be defined that allow improved functionality between users (e.g., a friend can obtain secured information, a friend can receive an update when a modification is made on an entry log, etc.). However, there are limitations associated with conventional social networking systems. Typically, there is often one type of available relationship in a social networking architecture (e.g., friend) that does not allow for a broad range of information dissemination. Classical social networking configurations are limited in how to treat different types of communications (e.g., differentiation between instant messages and electronic mail) and are therefore unsuitable for application in a business/office environment.

The subject innovation facilitates creating business profiles for individuals from information gathered from multiple non-private sources, and in relation to a business environment. A search component collects information from several sources (e.g., the Internet, an intranet, local storage, removable storage, . . . ), analyzes and filters the information in connection with generating or populating a business profile. The business profile can be generated by an individual desiring a profile about himself/herself, or by a third party. An entity seeking generation of or access to a profile can set parameters associated with the type, content, or context of the profile generated to customize the profile dynamically as needed. Likewise, an individual can optionally dictate sources of information employed in connection with formulating the profile as well as the overall content, or use thereof. Artificial intelligence-based tools and methodologies can be employed to automate various aspects of the foregoing features.

Classically, when an employee returns to his workstation (e.g., desktop computer), he checks his e-mail to determine relevant information. The subject innovation allows a user to be provided with a greater breath of information as part of a single construct. With the single construct, the employee can not only check his e-mail, but also learn about conversations between team members, read updated news, view modifications to documents, etc.

The following description and the annexed drawings set forth certain illustrative aspects of the specification. These aspects are indicative, however, of but a few of the various ways in which the principles of the specification can be employed. Other advantages and novel features of the specification will become apparent from the following detailed description of the specification when considered in conjunction with the drawings.

DETAILED DESCRIPTION

Figure 1:
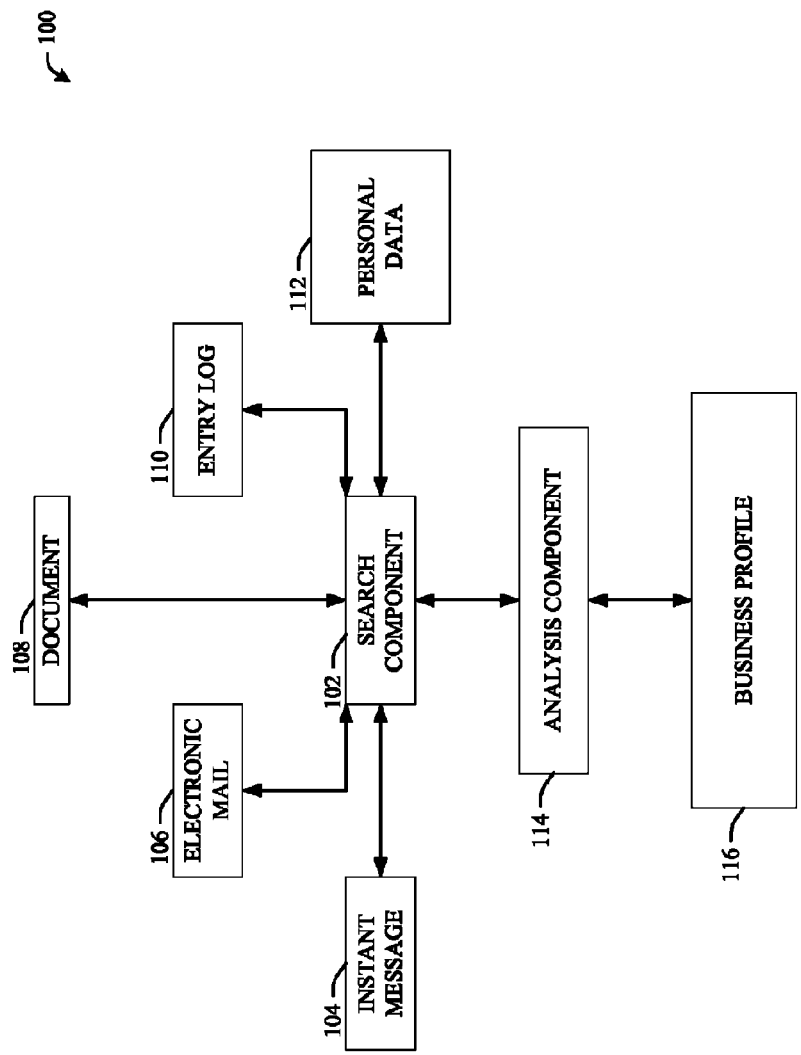
FIG. 1 illustrates a representative business profile generation system in accordance with an aspect of the subject specification.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It can be evident, however, that the claimed subject matter can be practiced without these specific details. In other instances, well-known structures and devices are shown in block diagram form in order to facilitate describing the claimed subject matter.

As used in this application, the terms "component," "module," "system," "interface," or the like are generally intended to refer to a computer-related entity, either hardware, a combination of hardware and software, software, or software in execution. For example, a component can be, but is not limited to being, a process running on a processor, a processor, an object, an executable, a thread of execution, a program, and/or a computer. By way of illustration, both an application running on a controller and the controller can be a component. One or more components can reside within a process and/or thread of execution and a component can be localized on one computer and/or distributed between two or more computers. As another example, an interface can include I/O components as well as associated processor, application, and/or API components.

Furthermore, the claimed subject matter can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications can be made to this configuration without departing from the scope or spirit of the claimed subject matter.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to disclose concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

FIG. 1 discloses an example system 100 for creation of a business profile. As noted supra, the business profile can be generated from a variety of information sources (e.g., the Internet, an intranet, local storage, remote storage, removable storage . . . ). A business network can have various amounts of information already available to different users (e.g., as a function of access rights). A search component 102 can gather data from a network that relates to an individual—the data can be gathered using a variety of manners (e.g., wireless access, network access, e-mail, data mining, real-time information monitoring and filtering, routers . . . ) depending on the sources of information. Additionally, the search component 102 can passively receive information (e.g., when a message is sent, a copy of the message is automatically passed to the search component 102).

In one example, users can communicate with one another through an instant message session—while the users are engaged in the session, a recording can be made of the session and saved to a local hard drive. When the session is complete, a saved version of an instant message 104 is available for further use. The search component 102 can access the instant message 104 during creation thereof as well as after completion. A person can compose an electronic mail (commonly referred to as e-mail) 106 and send the e-mail 106 to another person. The search component 102 can intercept the e-mail 106 and retain a local copy while passing the e-mail 106 to an intended location. A document 108 can be composed automatically when an application runs (e.g., when a purchase is made online, a purchase order is generated), through actions of a user, etc. The search component 102 can access a data source that holds different documents and download desirable information from the data source.

A person can have an online entry log 108 that relates to a topic (e.g., sports, politics, general life experience and observations, etc.). The search component 102 can perform a search to locate an entry log 108 (e.g., an entry log 108 that is located on an online page) that relates to a specific topic and gather contents of the entry log 108. Moreover, personal data 110 can be stored locally and the search component 102 acquires personal data 110. The instant message 104, e-mail 106, document 108, entry log 110, and personal data 112 are illustrative examples of information that can be obtained by the search component 102. It is to be appreciated that the search component 102 can gather other types of information. For example, the search component 102 views online news pages and downloads articles relevant to a field practiced by a user (e.g., if an employee is a musician, then the search component 102 can download an article discussing proposed changes in national copyright law).

An analysis component 114 evaluates the gathered data and employs a subset of the gathered data (e.g., a whole set or part or the set) in connection with generating a business profile 116. Commonly, the business profile 116 organizes at least two pieces of information into a construct where the organized pieces of information are contextually related (e.g., relate to an individual, relate to a project, and so forth). A business profile 116 can be a user interface that is presentable to a person, a stored file, etc. Classic social networking architectures commonly display a wide variety of information. For instance, they can disclose friends, an entry log, personal photographs, etc, through an individual profile. However, in a business context, different information should be disclosed and presented in a different manner.

The generated business profile 116 can be designed to operate in conjunction with a user workstation, thus creating a workstation business profile that can operate to improve operation of a user with regard to her employment/business relationships. Oftentimes, the workstation is a desktop computer, but can also implement upon other personal electronic devices such as cellular telephones, notebook computers, and the like. The innovation differs from conventional search crawlers that index a public Internet as well as personal contact information to build a profile. The conventional configurations are used to facilitate networking between individuals and for use upon the public Internet—these configurations commonly implement upon the public Internet and are not suited for use in a localized business environment. When implemented upon a workstation, according to one embodiment the business profile 116 can be provided to a user when the user signs-on to her workstation, thus enabling her to gather information relevant to her business tasks. While the workstation business profile can be presented over a public Internet, there can be added security if the business profile 116 resides upon the workstation or a protected network.

In an illustrative example of the system 100, a group of employees can be working on a new product. Different employees can be provided with an individual business profile 116 that can facilitate communication for development of the new product. Use of the business profile 116 can allow employees to share more knowledge with relation to the new product and thus work more efficiently. Individual profiles can include information from multiple projects; therefore, business profiles can be tailored specifically to responsibilities of an employee.

For instance, a project group can include nine different employees: a project leader, a software group leader, a hardware group leader, three programmers, and three engineers. A business profile can be generated and updated for the different employees with information that is tailored specifically to a worker. As new information is developed, it can be populated into the business profile 116 so the employee can have a greater understanding concerning the project.

Two engineers can have an instant message conversation concerning resistor and capacitor tolerance for the new project. Information shared between the two engineers can be beneficial to the other engineer, as well as the hardware leader and the project leader. At least part of the instant message conversation can be presented in business profiles of relevant members (e.g., the engineers, the project leader, and the hardware leader). This allows individuals to receive relevant information while not providing an exorbitant amount of information to team members (e.g., there is little reason for software workers to receive resistor tolerance information, especially if the information removes pertinent software information from a main display.) This discloses some differences between the social networking context and the business context. In the business context, different relationships are shown (e.g., a 'hardware' relationship where people receive certain updates and a 'general' relationship where other people receive certain updates) and people can have multiple relationships between one another; common social networking configurations use one relationship and are unable to distinguish between one another.

Different manipulations can be performed upon information that enters the business profile 116. For instance, an instant message 104 can be a long string of text that is difficult to digest. The analysis component 114 can take the instant message 104 and synthesize language to create an abstract that relates to the main points of the instant message 104. Various tools can be implemented upon information to allow for more productive entries in the business profile 116. Main phrases can be extracted from a communication and compressed into a summary. Extraction can take place according to a number of different embodiments. The analysis component 114 can perform a keyword search upon an obtained communication, perform a test to determine the likelihood of interestingness a phrase will have to a user (e.g., an individual for whom the business profile is created), use terms that appear most often, etc.

The system 100 can be configured to allow other individuals to view a business profile 116 (e.g., publish a business profile within the internal confinement of a company). Various types of functionality can be manifested allowing individuals to view business profiles 116. For instance, other employees can leave comments that relate to a specific entry log. According to one embodiment, the system 100 performs a search, finds information that relates to a person (e.g., work documents, web pages of a high likelihood of interest, news alerts, etc.), and generates a profile as a function of the search results—the raw search result data employed can also be made available via the profile.

Figure 2:
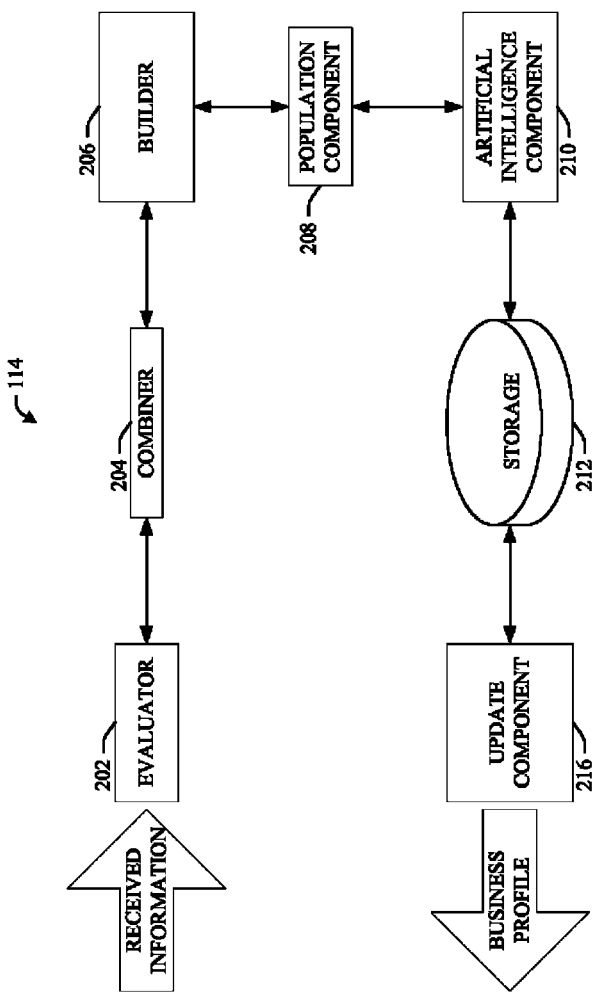
FIG. 2 illustrates a representative analysis component in accordance with an aspect of the subject specification.

FIG. 2 discloses an example analysis component 114 in accordance with an aspect of the subject specification. Various amounts of received information can enter the analysis component 114 from the search component 102 of FIG. 1. An evaluator 202 makes various resolutions that relate to operation of the analysis component 114.

One type of received information can be a request to create a business profile 116 of FIG. 1. A request can generate from a number of different sources and in different manners. A user can make an overt request that a business profile be created (e.g., a general request, a request with specific characteristics on how the profile is to be configured, etc.). The evaluator 202 can take actions to further construct a business profile 116 of FIG. 1 (e.g., determine that a user is authorized), determine properties of the business profile 116 of FIG. 1 (e.g., a user has difficulty seeing and desires information presentation in a large font size), etc. However, a request can also be generated automatically and processed by the evaluator 202. For instance, when a new employee has a profile entered into a company database, a business profile can automatically be created for the employee. The evaluator 202 can process modification requests that relate to a business profile 116 of FIG. 1. In an illustrative example, a default business profile can have a black and white color scheme and a user can send a request to modify the color scheme to include favorite colors (e.g., red and green). The evaluator 202 can process the request, determine if the request is allowable, and then send an instruction to a component capable of making a modification.

A combiner 204 integrates information together in a manner that can allow information to be appreciated more accurately and quickly by a user. Returning to the example of the business group, two programmers can have an instant message conversation that relate to solving an error message that relates to operation of computer code. While engaging in the conversation, numerous references can be made to the computer code. It can be beneficial for portions of the instant message conversation to be disclosed with sample computer code. Therefore, the combiner 204 can extract relevant portions of the instant message conversation, extract relevant portions of the computer code, and combine the relevant portions into one unit that can be disclosed in the business profile 116 of FIG. 1.

A builder 206 constructs a business profile template capable of being associated with information. Typically, a template is created with dynamic capabilities, such that the template can be modified to be properly populated. For instance, a template is constructed that has a capability of disclosing between five and fifteen pieces of information. Actions of other components (e.g., population of the template) determine how the template manifests into a business profile 116 of FIG. 1.

A population component 208 places at least some information into a business profile template. Placement of information into the template can take place according to a number of different embodiments. A request can have specification that should be followed concerning how information is to be populated. For instance, instant message conversations should be disclosed in an upper portion of a business profile while photographs should not be disclosed. However, the population component 208 can rely on logic to determine an organization of information in a template (e.g., information that should be placed in a location).

An artificial intelligence component 210 makes at least one inference or at least one determination or at least one of each in relation to gathered data, evaluated data, generation of business profile, or a combination thereof. Various scenarios can occur that are processed by the artificial intelligence component 210 thereby the artificial intelligence component 210 can function as a processor for the analysis component 114. For example, the artificial intelligence component 210 can make a determination that requests obtained by the analysis component 114 commonly instruct that e-mail information be placed prominently in a business profile 116 of FIG. 1. From the determination, the artificial intelligence component 210 makes an inference that the builder 206 should automatically place e-mail information prominently unless otherwise instructed. A modification notice can be transmitted to the builder 206 and the builder 206 can implement instructions in the modification notice.

The artificial intelligence component 210 can employ one of numerous methodologies for learning from data and then drawing inferences and/or making determinations related to profile creation (e.g., Hidden Markov Models (HMMs) and related prototypical dependency models, more general probabilistic graphical models, such as Bayesian networks, e.g., created by structure search using a Bayesian model score or approximation, linear classifiers, such as support vector machines (SVMs), non-linear classifiers, such as methods referred to as "neural network" methodologies, fuzzy logic methodologies, and other approaches that perform data fusion, etc.) in accordance with implementing various automated aspects described herein. Methods also include methods for the capture of logical relationships such as theorem provers or more heuristic rule-based expert systems.

Storage 212 holds various amounts of information that relates to operation of the analysis component 114. When operating, various components (e.g., the combiner 204) can utilize storied histories to make operation more efficient. For instance, artificial intelligence component 212 can use storage to record history of operation of various components and use records in making inferences and determinations. Storage can implement as flash memory, random access memory, read-only memory, etc.

An update component 214 modifies the business profile in accordance with a contextual change. A contextual change can be an alteration concerning operation of the analysis component 114. This includes new information that is received by the analysis component 114, a change in operation of a component of the analysis component (e.g., the artificial intelligence component 210 instructs a component to operate differently), received information that is changed (e.g., received time information changes periodically, such as every minute), etc.

An effective business profile 116 of FIG. 1 can be a dynamic unit that allows a user to appreciate a wide range of information. The update component 214 can modify information according to a number of different embodiments. In a descriptive instance, a business profile 116 of FIG. 1 does not show an e-mail message. However, an important message from a company Chief Executive Officer can be sent to a user associated with the business profile 116 of FIG. 1. The update component 214 can receive the e-mail and place the e-mail in the business profile 116 of FIG. 1; thus, a user perceives an important message. In this instance, the contextual change is that a new important e-mail is received.

Figure 3:
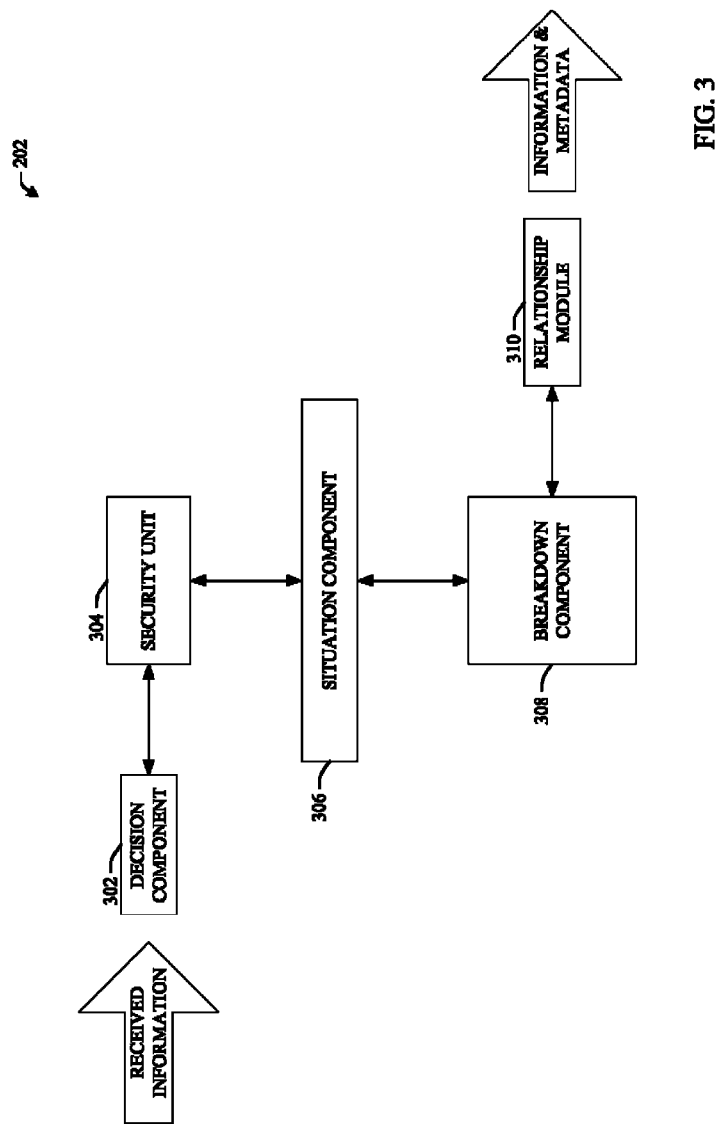
FIG. 3 illustrates a representative analyzer in accordance with an aspect of the subject specification.

FIG. 3 discloses an example evaluator 202 concerning an aspect of the subject specification. When various amounts of information transfer from a search component 102 of FIG. 1 to an analysis component 114 of FIG. 1, the evaluator 202 commonly processes the information. The evaluator 202 can be a unit that is first in time to perform operations upon received information; however, the evaluator 202 can function later.

A decision component 302 selects obtained information for association into the business profile 116 of FIG. 1. Virtually any information can be included in the business profile 116 of FIG. 1. Since there is commonly practical limitations on how much information can be held by the business profile 116 of FIG. 1 (e.g., an amount of information a user can reasonable appreciate), the decision component 302 selects what information should be placed in the business profile 116 of FIG. 1. In one embodiment, the business profile 116 of FIG. 1 holds gathered information, and the decision component 302 selects information that is to be disclosed in a user interface relating to business profile 116 of FIG. 1.

For example, a company Vice President can receive a massive number of e-mails in one day. It would be impractical for the Vice President to have each e-mail displayed in full in the business profile 116 of FIG. 1. Therefore, the decision component 302 can elect e-mails that have a relatively high likelihood of being of interest to the Vice President and show those e-mails in the user interface; non-presented e-mails are held in local storage. In an illustrative instance, an e-mail from a company Chief Operating Officer can appear in the business profile 116 of FIG. 1 while an e-mail from an individual with a less direct relationship to the Vice President can be disregarded in the profile.

The decision component 302 can make other selections concerning the business profile 116 of FIG. 1. A user can prefer to view entry log information over instant message conversations. Therefore, the decision component 302 can make an election consistent with the preference. By operating upon a user preference, an instant message conversation can be presented initially to a user through the business profile 116 of FIG. 1. However, an update can be placed in an entry log and the update is obtained by the evaluator 202. The decision component 302 can then elect to replace the instant message conversation with updated entry log information in the business profile 116 of FIG. 1.

The decision component 302 can operate as a means for authenticating a requestor's access rights. A requestor can ask to see a business profile of a co-worker. However, the business profile can have a breadth of information, some of which should not be disclosed to certain people. For instance, if a business profile includes salary information, then a select group of people should have access to this information (e.g., supervisors, company accountants, etc.). The decision component 302 can determine if a requestor's access rights are in line with a request. The result of a determination made by the decision component 302 can transfer to a security unit 304, where the security unit 304 commonly implements information dissemination based at least in part from a determination made by the decision component 302.

A security unit 304 enforces security policies in connection with data access, or dissemination. Information in a business environment can have various levels of importance as well as various levels of sensitivity. The security unit 304 can make a determination if information should be disclosed in the business profile 116 of FIG. 1. For instance, portions of an instant message conversation between a Chief Executive Officer and Vice President concerning a possible location of a summer picnic can be presumed as allowable information and be passed through the security unit 304 to be placed in a business profile of a general employee. However, portions of the same instant message conversation that concern a confidential matter are presumably not proper to be placed in a business profile of a general employee and are rejected by the security unit 304. The security unit 304 can operate as a means for selectively masking, or exposing portions of the business profile as a function of requestor needs and data access rights.

In one example, a business profile 116 includes evaluation information concerning a person associated with the profile (e.g., reviews from superiors, salary information, data that relates to promotions, etc.) This information can have certain levels of confidentiality such that there are limits on people that can view the information. The security unit 304 can place limitations on people who can access information. For instance, if a janitor requests a profile of a project manager, then the janitor likely has little need for the information and has minimal access rights; therefore, the security unit masks sensitive information. Masking can be explicit (e.g., blank spaces are shown where data would be if a person had access rights), hidden (e.g., business profile 116 of FIG. 1 is configured in a way that one would not readily notice information was masked), etc. If a human resources manager requests the same profile requested by the janitor, then it is exposed since the human resources manager likely has a need and has extensive access rights.

A situation component 306 determines at least one presentation construct associated with the business profile 116 of FIG. 1. Some information can have different levels of accessibility. In one example, a government office can require that salary information of employees be available to the public; therefore, it is unlikely this information is prevented disclosure by the security unit 304. However, administrators can still desire to keep salary information relatively guarded (e.g., salary information is not presented unless it is requested.) Therefore, unless a user makes a specific request 'place salary information in my business profile', information that relates to salary is rejected.

A breakdown component 308 collapses at least part of a group of information into a conversation unit. Many information types are made of a conversation atomic unit. The breakdown component 308 can deconstruct information into a conversation unit so there can be equal evaluation between information (e.g., components can process information at a conversation level regardless of type).

A relationship module 310 analyzes an affiliation between items (e.g., pieces of information, users, etc.), where the affiliation is used to associate information into a business profile. For example, a piece of information processed by the evaluator 202 can be a word processing document. The word processing document can have different relationships with various users and/or information types. A table in the word processing document can link to a spreadsheet; thus there is a dependent relationship (e.g., the word processing document is dependent on information of the spreadsheet.) However, if the word processing document provides explanations for a schematic diagram, then there can be a concurrence relationship (e.g., the word processing document and schematic diagram can operate in a beneficial manner together, but are not dependent upon one another.) The relationship module 310 can appreciate different relationships, which differs from operation of a social networking architecture. Various amounts of metadata (e.g., relationships between information units, presentation construct details, etc.) can pass to other units of the analysis component 114 of FIG. 1.

The relationship module 310 can operate as a means for identifying at least two relationships of different types included in the business profile. Conventional networking systems that employ profiles recognize a single relationship (e.g., friend). Use of the relationship module allows different relationships to be represented in a business profile 116 (e.g., relationships with other people, relationships with digital files, membership in a group, etc.). In an illustrative instance, a user can have a co-worker relationship type in the business profile and a supervisor relationship type. Identification of at least two relationships includes ascertaining types of relationships associated in the business profile (e.g., learning of a supervisor type relationship and co-worker type of relationship), determining characteristics of the types (e.g., there is limited access to information of another profile of a supervisor relationship), ascertaining specific relationships included in the types (e.g., a person with a business profile has three co-worker relationships and one supervisor relationship), etc. The relationship module 310 can send a request to the security unit 304 to determine if relationship data should be exposed or masked to a person who requests a business profile 116 (e.g., complete masking, complete exposing, exposing some relationship types while masking other types, masking relationships that apply to certain people, etc.).

Figure 4:
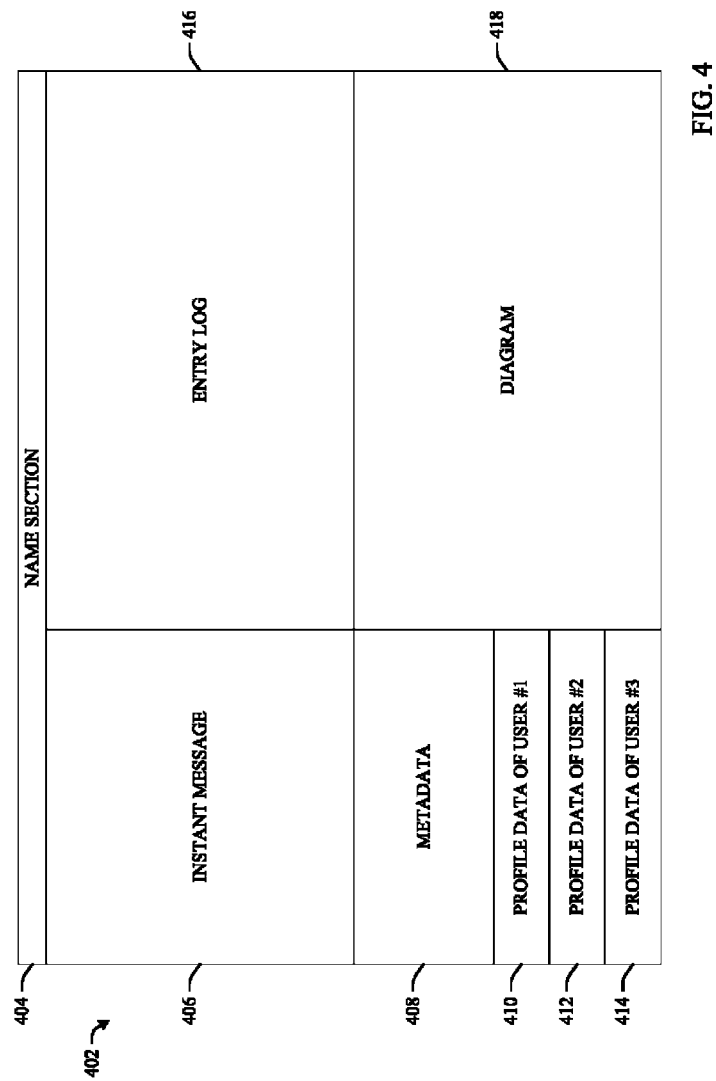
FIG. 4 illustrates a representative business profile display in accordance with an aspect of the subject specification.

FIG. 4 discloses an example user interface 402 that is associated with a business profile 116 of FIG. 1 (e.g., the user interface 402 is the business profile 116 of FIG. 1, the business profile 116 of FIG. 1 generates the user interface 402, the user interface 402 discloses portions of a business profile 116 of FIG. 1, etc.). Different information can be presented in locations of the user interface 402. According to one embodiment, the user interface 402 operates in a semi-static manner. For instance, e-mail information is presented in an upper right portion of the user interface 402. While specific e-mail information can change (e.g., a new message can be received that is displayed over an old message), placement of an e-mail does not change.

In the user interface 402, a name section 404 discloses identification information related to the user interface 402. A business profile 116 of FIG. 1 can be designed for a single person (e.g., from the project group example, the user interface 402 is for one of the engineers) or for a group of people (e.g., the project group). This allows a reader to ascertain quickly if a user interface 402 is intended for him/her; thus adding a security feature.

An instant message 406 can be presented as well as metadata 408 concerning the instant message 406. Metadata 408 allows a user to understand an instant message 406 conversation in context. Example metadata 408 includes time, date, keywords, security level, etc. There can be profiles 410-414 of different users that participated in the instant message 406; this can allow a user to determine relevance for the instant message 406. In the project group example, a conversation between the project leader, software group leader, and hardware group leader can be more valuable then a conversation between the three engineers. Therefore, if profiles of these three are disclosed, a viewer can quickly appreciate that a conversation has a high likelihood of being important.

An entry log 416 can be presented as part of the user interface 402. A researcher on a topic of interest to the project group can have an online entry log discussing recent discoveries. When an update of the entry log takes place, the update can be replicated on the displayed entry log 416. A diagram can be extracted from the entry log and a diagram 418 can be placed as part of the user interface 402.

The user interface 402 can be configured with various features that improve functionality in relation to operation with a user. For instance, when new information is added to the user interface 402 (e.g., the entry log 416 is replaced with an incoming e-mail), a notice action can take place (e.g., the incoming e-mail portion of the user interface begins flashing, a sound is played to notify a user, etc.) Moreover, the user interface 402 and business profile 116 of FIG. 1 can utilize non-visual sensory elements to benefit a user (e.g., when a change is made in the business profile 116, a sound is played).

In one arrangement, the business profile 116 of FIG. 1 and a relating user interface 402 can be segmented by topic. For example, the instant message 406, metadata 408 and profile data 410-414 can be dedicated to a project a user is working on; project information is placed on the left of the user interface 402. However, an entry log 416 and diagram 418 can relate to financial information of the company and this information is placed on the right side of the user interface 402. It is to be appreciated that the business profile 116 of FIG. 1 and user interface 402 can include non-business information, such as a personal e-mail account.

Figure 5:
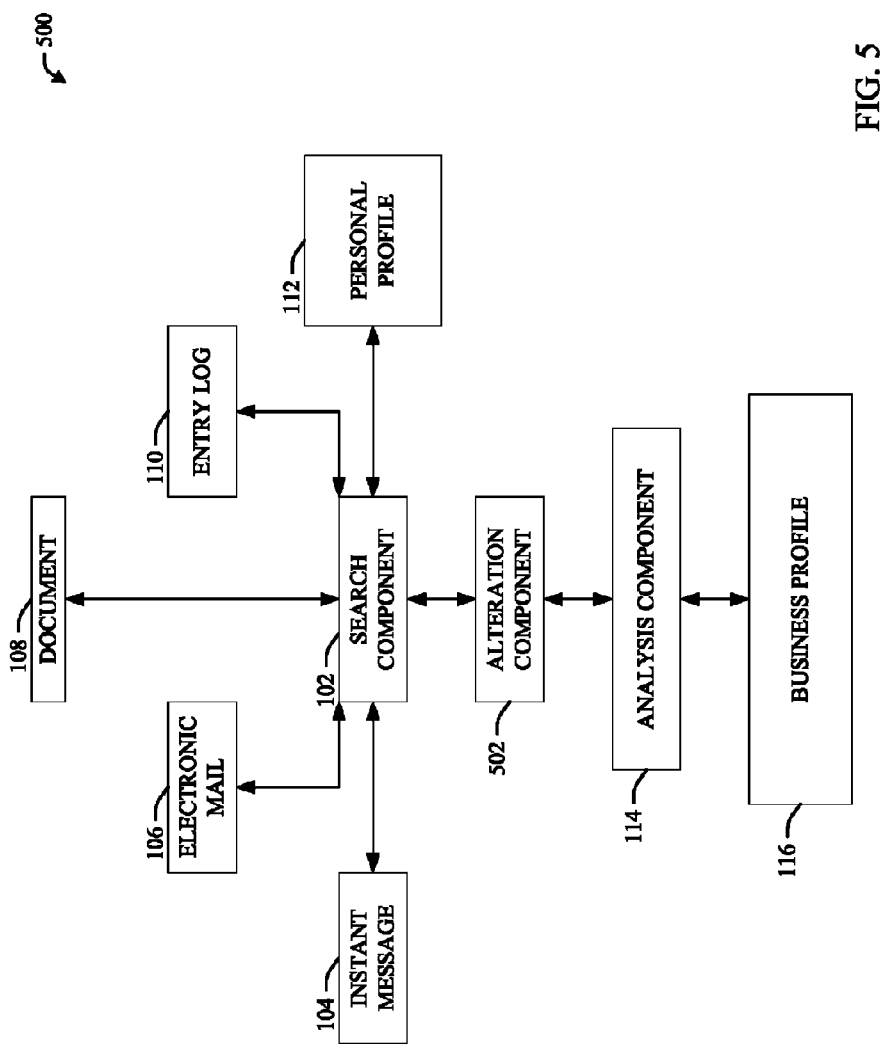
FIG. 5 illustrates a representative business profile generation system with an alteration component in accordance with an aspect of the subject specification.

FIG. 5 discloses an example business profile construction system 500 with an alteration component 502. A search component 102 can obtain various amount of information. Examples of information obtained by the search component are an instant message 104, e-mail 106, document 108, entry log 110, personal profile 112, etc.

However, when data is received by the search component 102, it can be in a relatively raw format. The alteration component 502 modifies format of at least part of information obtained by the search component 102 or modifies evaluated information. For instance, the entry log 110 can be posted online in one format. However, a business profile 116 of the system 500 is generated through use of a second format. The alteration component 502 can modify gathered information to a language suitable for other components of the system 500 (e.g., a language used to generate the business profile 1116).

Once appropriate modifications take place through operation of the alteration component 502, information can transfer to an analysis component 114. The analysis component 114 associates gathered information into a business profile 116. The business profile 116 is presented to a user (e.g., manifested through a user interface of a display component) in a structured manner.

Figure 6:
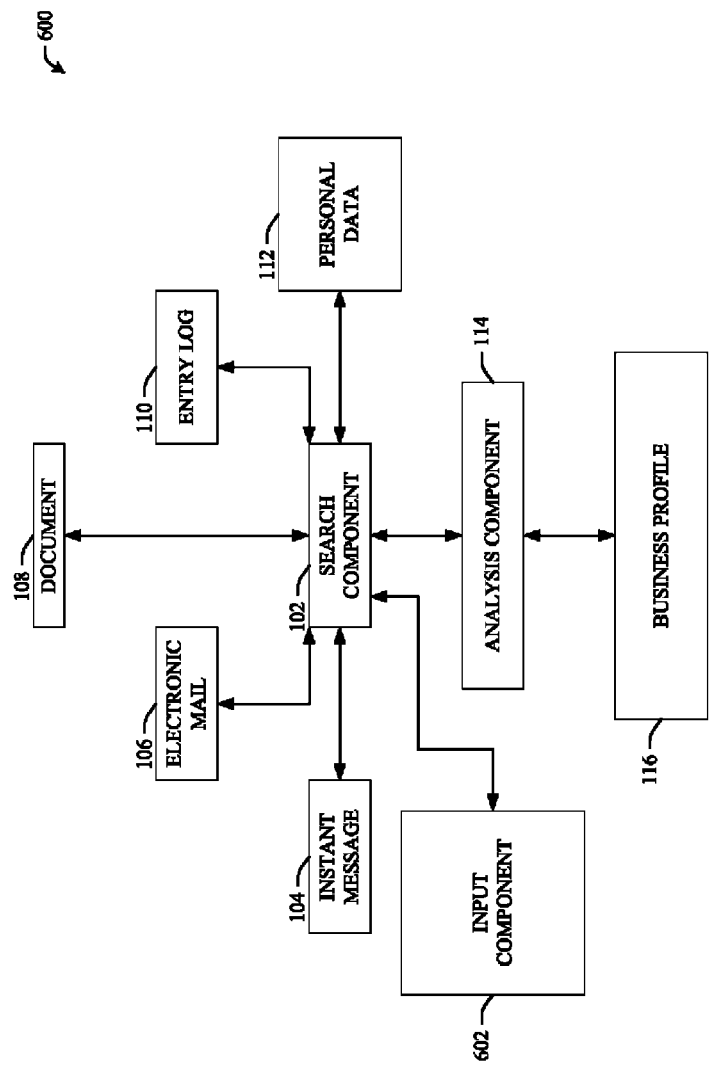
FIG. 6 illustrates a representative business profile generation system with an input component in accordance with an aspect of the subject specification.

FIG. 6 discloses an example business profile construction system 600 with an input component 602. A search component 102 can obtain a variety of information. Instances of information obtained by the search component 102 are an instant message 104, e-mail 106, a document 108, an entry log 110, a personal profile 112, etc. An input component 602 can be used to provide information to the search component 102. A non-exhaustive list of input components 602 that can be implemented in the system 600 include a keyboard, mouse, microphone, optical reader, touch screen, scanner, etc. Moreover, the input component 602 can function as a means for receiving a request for access to a business profile relating to an individual (e.g., requested by a user, requested automatically by an internal component such as a processor, . . . ).

A person can desire for a business profile 116 to have specific qualities; qualities can range from cosmetic to functional. For instance, a user can have an aspiration that a drawing held in a file be placed in a prominent position of a business profile 116. The user transfers instructions to the search component 102 through the input component 602 (e.g., an instruction to download a document that is to be included in the business profile and exposed to a requestor). The person requesting is not necessarily a person for which the business profile 116 is created. A human resources representative can use the input component 602 to create guidelines for generation of a business profile 116 for a third party.

The analysis component 114 associates gathered information (e.g., including information entered through the input component 602) into a business profile 116. The business profile 116 is accessible to a user (e.g., manifested through a user interface of a display component) in an ordered approach. A display component can integrate with the input component 602 and thus be one unit (e.g., the input component 602 is a touch screen that can also display a business profile 116 that is a user interface.) Moreover, the business profile 116 can be presented through a non-visual implementation, such as incoming messages are verbally read to a user who has visual impairment. A module that can produce the non-visual implementation can integrate with the input component 602.

Figure 7:
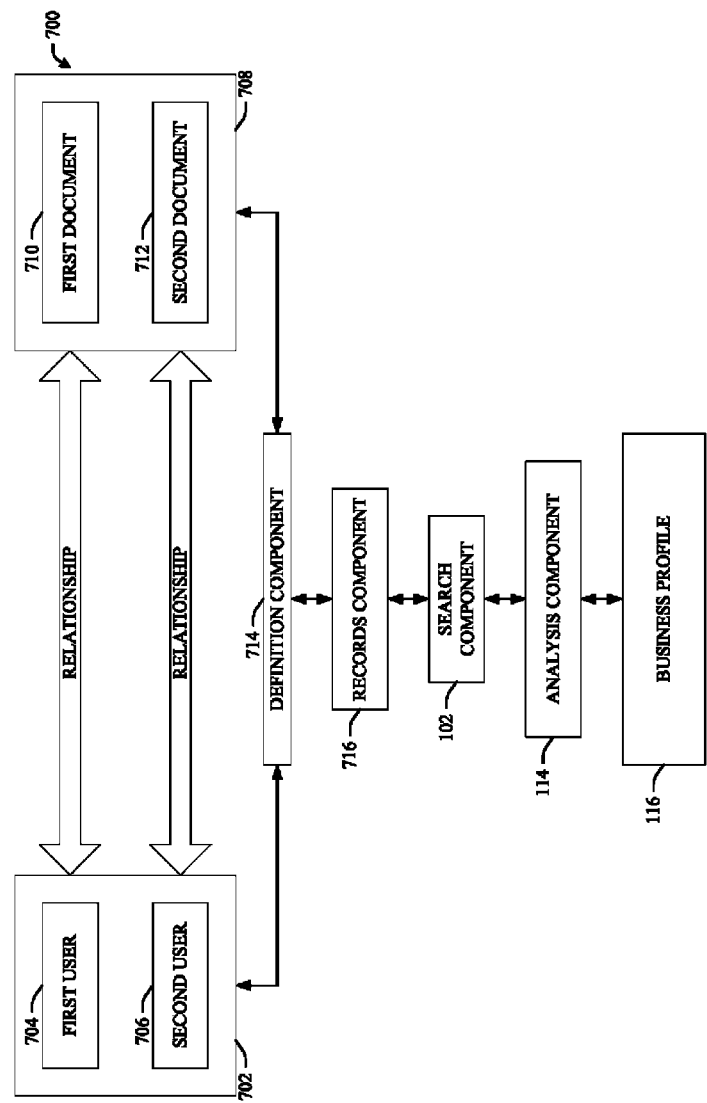
FIG. 7 illustrates a representative relationship appreciation system in accordance with an aspect of the subject specification.

FIG. 7 discloses an example system 700 for disclosing a business profile 116 with relationship information. In a common system, various relationships exist between different entities (e.g., friend, contact, partner, etc.) Conventionally, in a social networking architecture, one relationship is used (e.g., a friend relationship) and thus valuable information can be lost if multiple types of relationships exist, but are unappreciated.

There can be a set of users 702 (e.g., a set is one or more) that includes a first user 704 and a second user 706. The set of users can have various relationships with a set of documents 708. The set of documents can include a first document 710 and a second document 712. While documents are disclosed, it is to be appreciated that relationships can be established between a group of users and a group of digital files (e.g., documents, images, profiles, etc.).

A definition component 714 classifies at least one relationship between a set of users and a set of digital files. Example relationships include full modification capabilities, history communication (e.g., users can learn names of former modifiers), etc. In order to perform further processing upon information (e.g., the set of documents 708), different relationships of the information should be valued. Classification can take place according to a number of different embodiments. For instance, the definition component 714 can observe interactions between the set of users 702 and the set of documents 708 to learn their relationships; the definition component 714 can also read data held in storage to determine relationships. Moreover, relationships can be organically classified (e.g., structured relationships do not exist, but they can be created from observing how the set of users 702 interacts with the set of documents 708).

A records component 716 stores at least a portion of a digital file (e.g., documents) from the set of digital files in a format that is readily accessible by any of a subset of users, the subset of users having an existing relationship with the digital file. In order for users to operate upon at least a portion of the set of documents, the documents should be in a format accessible to a user.

A search component 102 gathers various amounts of information that relates to the system 700. This includes relationship information and location of a stored digital file in a specific format. An analysis component 114 allows any of the subset of users to modify the digital file. Commonly, the users can modify the digital file through a business profile 116 created through the analysis component 114. For instance, a tool (e.g., wizard) can be part of the business profile 116 that allows the user to alter a document.

Figure 8:
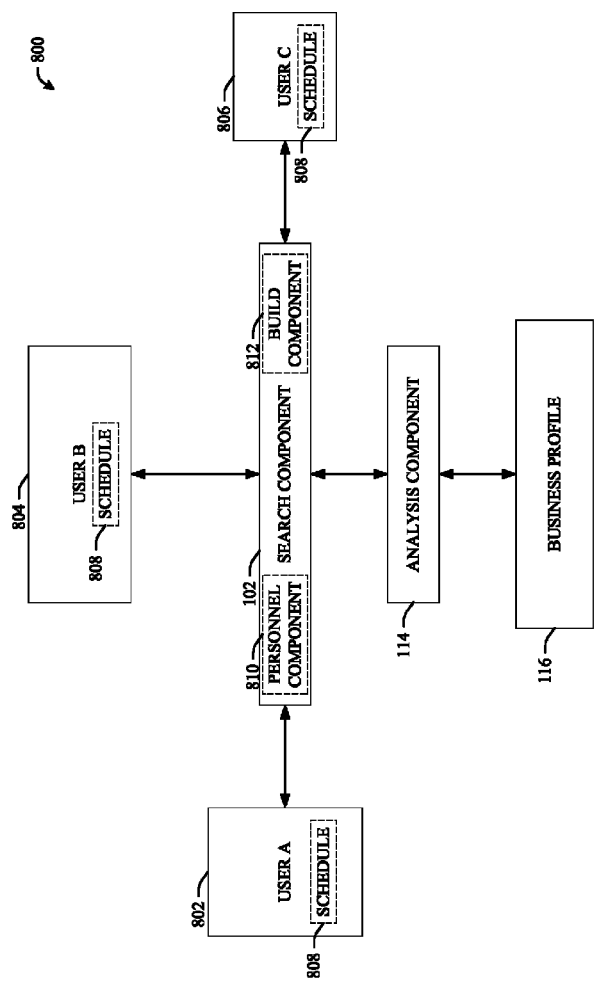
FIG. 8 illustrates a representative scheduler system with an alteration component in accordance with an aspect of the subject specification.

FIG. 8 discloses an example system 800 for creating a team. A search component 102 can locate individuals that have a capability of working on a project. In an illustrative example, three individuals (e.g., User A, User B, and User C) are part of a company working with a person with a business profile 116. Each person can have different strengths, weaknesses, backgrounds, etc. that relate to a project. In a specific example, the three people can be electrical engineers employed in a single office of a company. A search component 102 can locate business profiles 802-806 for User A to User C respectively. Commonly, business profiles include a schedule 808 that discloses an agenda for an associated user.

A personnel component 810 identifies from the gathered data (e.g., discovered profiles) at least one individual from a plurality of individuals having particular skill-sets of interest. In an example, a person with a business profile 116 can desire to start a project team for designing a garage door opener with a control system. The personnel component 810 can identify a person that has a specialty in an area (e.g., electrical engineer with a background in control systems), who has worked on similar projects (e.g., worked on boat storage facilities), who has worked in relevant areas (e.g., designed door locking mechanisms), has a personal interest in a topic (e.g., part of a national automotive society), etc.

A build component 812 creates a team of individuals respectively possessing desired skill-sets, and an analysis component 114 generates a business profile 116 concerning the team. Commonly, the build component 812 can evaluate schedules 808 of respective users to determine individuals that have availability to become part of a specific team. The build component 812 creates the team as a function of potential team member availability. For instance, if in two weeks it is estimated an employee will dedicate fifteen hours to work on the project, the build component 812 can determine users that have fifteen free hours in coming weeks and add those users to a team.

Moreover, the build component 812 can use Artificial intelligence component 210 of FIG. 2 to perform scheduling operations. Different projects can have levels of priority; the build component 812 can construct a team based on priorities assigned to projects for users. If User A has a filled schedule, but assigned projects are lower in priority then a garage control system project, then the build component 812 can make modifications of schedule 118 to enable a user to become part of a team for the garage control system project. An analysis component 114 evaluates gathered data and generates a business profile 116 as a function of analyzed data. In the system 800, the business profile 116 is modified to include information that relates to construction of a new team and relevant information concerning team members (e.g., team member schedules).

Figure 9:
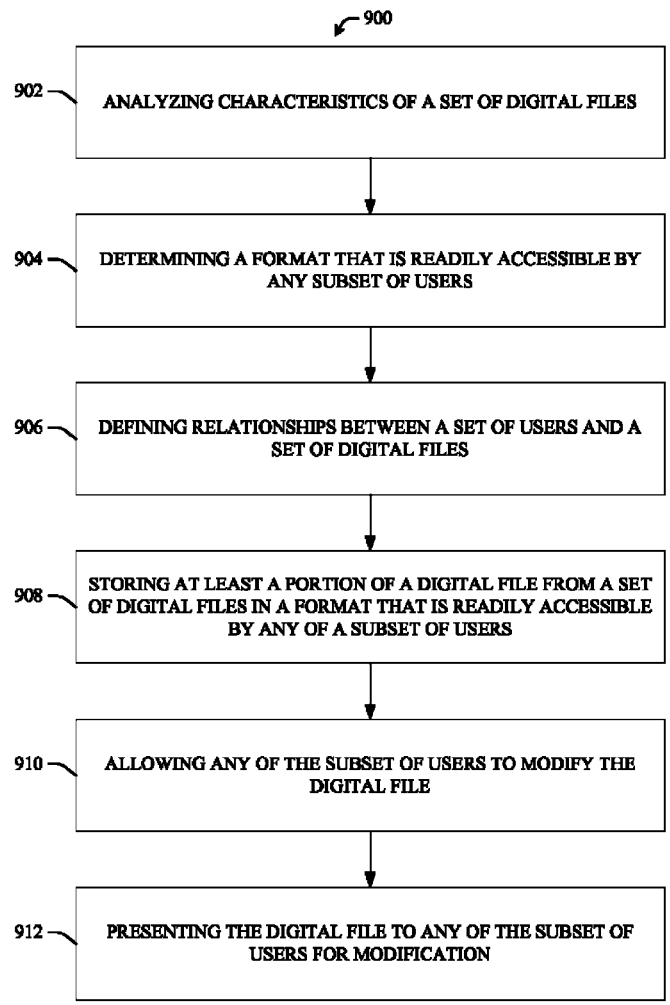
FIG. 9 illustrates a representative methodology for processing relationships in accordance with an aspect of the subject specification.

FIG. 9 discloses an example methodology 900 for enabling users to make modifications upon a digital file. Analyzing characteristics of a set of digital files 902 takes place so know beneficial knowledge can be gained concerning the digital files. Digital files (e.g., documents, pictures, computer code, etc.) have various characteristics that relate to their functionality. For example, digitals files commonly have a storage size, modification history, creation metadata (e.g., time and date when created), etc. Analyzing the characteristics can produce a greater understanding of how digital files are configured and this comprehension can be used in creating a business profile that is beneficial to a user.

Action 904 is determining a format that is readily accessible by a subset of users. Commonly, a subset of users (e.g., a whole set of users, a portion of a whole set of users, etc.) can share a common resource. For instance, the subset of users can be employees of a company that have similar computer applications available (e.g., a common word processing application) and/or share one common resource (e.g., a public drive where information can be saved and accessed by different users). A search can be performed on accessible resources of the subset of users and results of the search can be used in making a determination related to business profile creation.

Defining relationships between a set of users and a set of digital files 906 takes place. Different relationships can exist between users and digital files (e.g., access rights, histories, etc.). These relationships can be static or dynamic as well as change over time (e.g., originate as dynamic and then become static). Relationships can be loose affiliations that are not clearly standardized (e.g., a highest ranking member that views a digital file, such as a Vice President, can full access rights while subordinates have read-only rights; the highest member can change if a President views the digital file and thus there is not a set standardization).

Storing at least a portion of a digital file from a set of digital files in a format that is readily accessible by any of a subset of users 908 takes place, where the subset of users have an existing relationship with the digital file. The scope of allowable formats can be limited to users that have an existing relationship with the digital file (e.g., users that have previously accessed the file are taken into consideration when determining allowable formats). A saved file can be an alteration of an original (e.g., the digital file is saved in a format readily accessible to users), a created copy (e.g., a second version of the digital file in a new format), etc.

Event 910 is allowing any of the subset of users to modify the digital file. Allowable modification can be complete (e.g., a user can modify anything) or limited (e.g., a user can make changes, but cannot save over an original file). The modifications are replicated commonly in business profiles of other users (e.g., if 'user A' modifies a document, then a modified document can be disclosed in a business profile of 'user B').

Presenting the digital file to any of the subset of users for modification 912 occurs, such as through a visual display of a computer monitor. Typically, file presentation is performed through a business profile that includes a user interface. The user interface can disclose a tool with the digital file that allows a user to make modifications with relative ease. Presentations can be uniform to users in the subset or can be tailored specifically to individual members of the subset based on individual needs (e.g., a color-blind user can have color properties removed and/or modified, such as changed to black-and-white).

Figure 10:
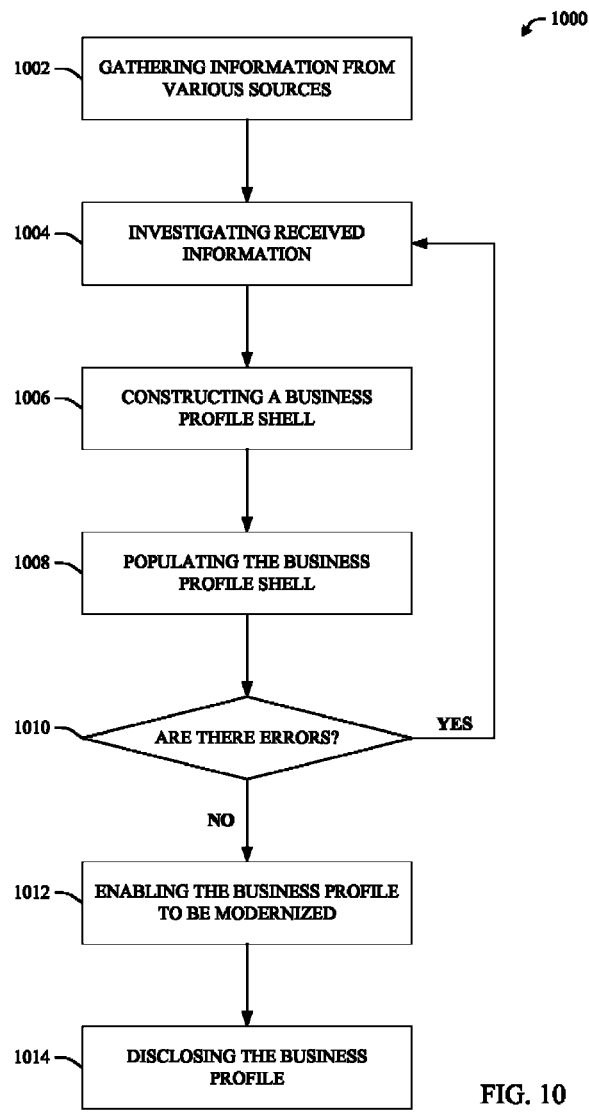
FIG. 10 illustrates a representative business profile creation methodology in accordance with an aspect of the subject specification.

FIG. 10 discloses an example business profile creation methodology 1000. Event 1002 is generating information from various sources. In order to create an informative business profile, a relatively large amount of information is included in a business profile (e.g., information from at least two different sources). Thus, a relatively large amount of information should be gathered and evaluated. Gathering can take place through wireless communication, downloading, making copies, etc.

Event 1004 is investigating received information; in order to determine what information is to be placed in a business profile, the information should be evaluated to determine various characteristics that are relevant to placement. In an illustrative instance, a received piece of information can be analyzed to determine how often a user has viewed information of that type. Information types that have been viewed frequently can be listed as more likely to be relevant and thus more likely to be of use if placed in a business profile.

Constructing of a business profile template 1006 occurs. A template is a general outline that is capable of receiving information. Since information can change (e.g., text of an entry log), it can be beneficial to have a space for the information that is not subject to change (e.g., regardless of a change in an entry log, there is a space in a template for entry log information.) A template allows for a space designated to an information type that does not have to experience large modifications when an update occurs; this can increase efficiency and save system resources.

Event 1008 is populating the business profile template 1008; information selected for placement into the template enters the template at event 1008. Population can take place through a number of different embodiments. For example, code can be written that mirrors information in a remote location (e.g., an online server). The code is associated with a portion of the business profile template (e.g., code is dedicated to controlling a portion of a business profile).

A check 1010 takes place to determine if there are errors related to the business profile. Error determinations can take place through analysis of results of various events. Receiving information can include obtaining at least one user preference regarding a business profile. User preferences can be compared against a populated template and if there are discrepancies, then corrective actions can take place.

If there are errors, then the methodology 1000 can investigate received information and attempt to generate a new business profile (e.g., return to act 1004), terminate the methodology 1000, etc. Error tolerances can be employed by the check 1010. A certain level of errors can be accepted, but if a threshold is met (e.g., about 25 identified errors), then correction actions occur.

Enabling the business profile to be updated can take place 1012, commonly if errors are within a set standard. A created and populated template can have dynamic data, such as a news feed from an online web page. As news occurs, different articles can appear on the web page and the articles are to be shown in the business profile. Event 1014 is disclosing the business profile. Disclosure of the business profile allows a user to appreciate different amounts of information that relate to the report. As opposed to a conventional system that provides is singular piece of information (e.g., e-mail), disclosing various types of information in an industry setting allows for employees to quickly gain valuable information in relation to their employment duties.

Figure 11:
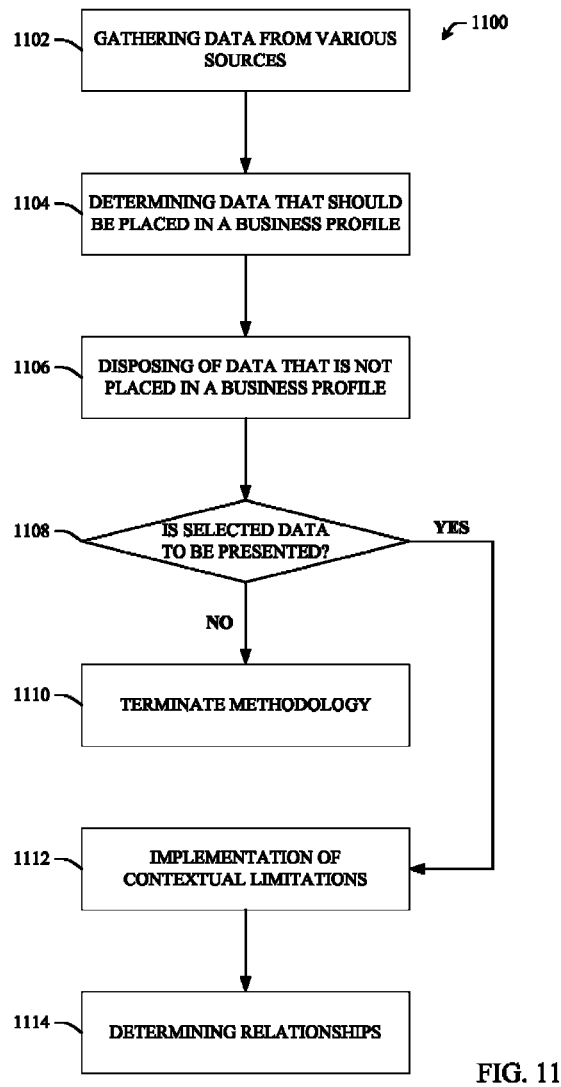
FIG. 11 illustrates a representative methodology for analyzing received information in accordance with an aspect of the subject specification.

FIG. 11 discloses an example data analysis methodology 1100. The methodology 1100 can disclose aspects that relate to performance of action 1004 of FIG. 10. Action 1102 is gathering data from various sources; data can include information that can be populated into a business profile as well as metadata that relates to information (e.g., a path on how to obtain information).

Determining data that should be placed in a business profile 1104 occurs; such as information that is to be placed in a business profile, information that is to be placed in a user interface related to a business profile, etc. It is possible that a large amount of information is available for placement upon a business profile. Therefore, decisions are made on what information should enter the business profile and what information should be excluded. Determination can be made in various manners; for instance, event 1104 can employ statistical probability, user requested parameters, learned algorithms, random selection, etc.

Disposing of data that is not placed in a business profile 1106 occurs, such as filing the data in a remote storage location or removing the data from local storage. Different types of disposition allow for different forms of functionality. Data that is not used can be blocked to conserve resources of a system implementing the methodology 1100. However, data can merely be saved in local storage and be accessed later through an update of a business profile/user interface (e.g., changing information types of a presented business profile).

A check 1108 occurs that determines if selected data is to be presented to a particular user. The check 1108 can be a security investigation that evaluates sensitivity of information. For instance, a business profile can be intended for a low-level employee and trade secret information is not intended to be presented to low-level workers. If data selected for inclusion does not meet security parameters, then the methodology 1100 terminates at event 1110. However, it is possible that limited security features are implemented based on a result of the check (e.g., an e-mail is shown, but portions of the e-mail are blacked out). Once there is security implementation, the methodology 1100 commonly does not need to terminate and proceeds to other actions.

There can be implementation of contextual limitations 1112 that relate to received information. While some information can pass through the check 1108, it can still be desirable that some information be difficult to locate. For instance, information can be presented in a business profile when a user makes a specific request for presentation of the information, otherwise information is not shown.

Event 1114 is determining relationships (e.g., interconnections between a user and information, between different types of information, etc.), which can be practiced according to a number of different embodiments. Evaluations can take place regarding how different pieces of data interact with one another as well as how they interact with different users. Based on these evaluations, relationships can be appreciated that are used in generation of a business profile.

Figure 12:
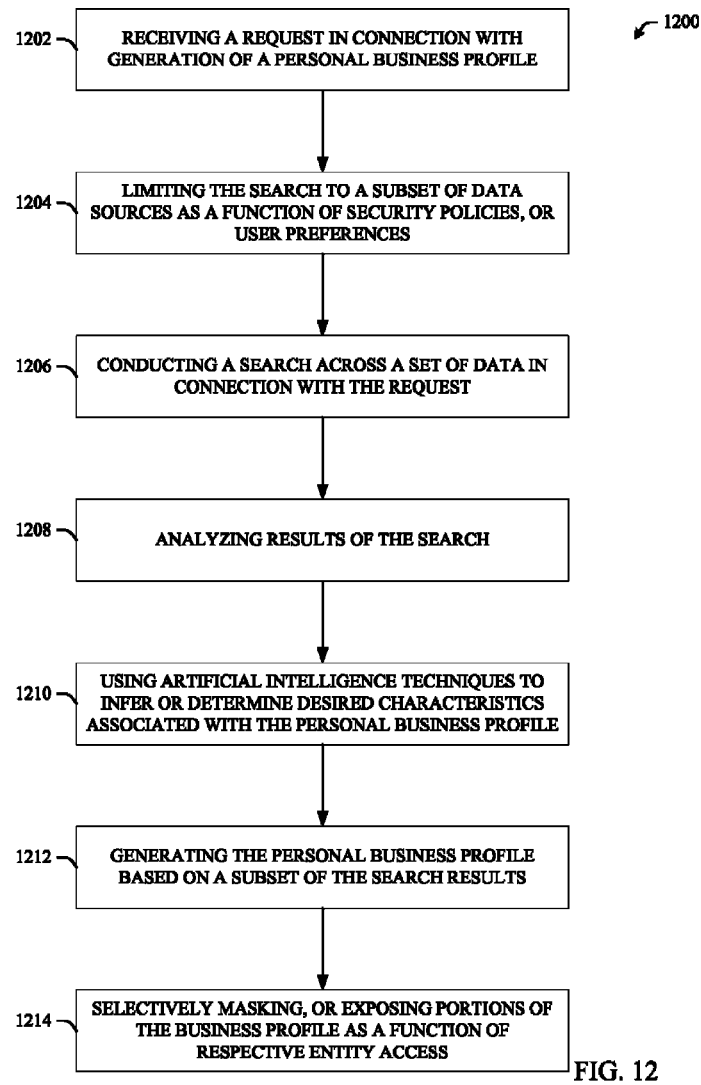
FIG. 12 illustrates a representative methodology for generating a personal business profile in accordance with an aspect of the subject specification.

FIG. 12 discloses an example methodology 1200 for generating a business profile (e.g., the business profile 116 of FIG. 1). Event 1202 is receiving a request in connection with generation of a personal business profile. Commonly a request originates from an individual, however, a request can arise from an automatic procedure (e.g., a processor identifies that a new employee has entered a company and a request is automatically generated when a new employee is hired.) The request can include instructions for the business profile, such as what is to be included in the business profile, what is to be disclosed to other users, what is to be placed in a user interface associated with the business profile, etc.

Limiting the search to a subset of data sources as a function of security policies, or user preferences 1204 occurs. For security purposes, companies can set policies that certain data sources be excluded. In an illustrative example, a nation can have a regulation forbidding display of iconography relating to a specific political party. In order to comply with a regulation, a company can set a policy that bans data sources holding forbidden iconography (e.g., a web page in another nation that does not forbid the iconography can be excluded from a search.) A user can be offended by some content and a request is made to exclude information from certain sources (e.g., information relating to violent crimes).

Event 1206 is conducting a search across a set of data in connection with the request. Data can be located in a plurality of places, such as on the Internet, in local storage, as part of a removable device, across a wireless channel, etc. A search can take place upon data stored in the plurality of places. The search can produce results that include data that relates to a received request and the search can follow limitations disclosed in action 1204.

Act 1208 is analyzing results of the search; a large amount of information can be gathered through the search and analysis allows information to be partitioned (e.g., some information placed in an allowable area, some information placed in a blocked area, etc.). It would be cumbersome for a single profile to include entire search results. Analysis allows for different characteristics of information to become known; characteristics can be used to determine information that is to be included in a business profile, what is to be presented in a publicly shown profile, what is to be shown in a user interface, etc. Example characteristics include data storage size, date when data became available (e.g., date when a web page was posted on the Internet), a calculated likelihood of relevance, etc.

Using artificial intelligence techniques to infer or determine desired characteristics associated with the personal business profile 1210 takes place. Techniques that can be practiced include those discussed in reference to the Artificial intelligence component 210 of FIG. 2. An example determination includes selection of information that is to be populated into a business profile template. Moreover, action 1210 can include inferring that information with a relatively high likelihood of relevance (e.g., relative likelihood compared to other pieces of available information should be placed into a business profile.

Event 1212 is generating the personal business profile based on a subset of the search results. The subset of the search results that the business profile is based on is commonly selected at least in part through determinations and/or inferences of the artificial intelligence techniques. According to one embodiment, a business profile template is initially generated and then the template is populated with specific search results. However, a business profile can be generated from integrating search results together into one construct without use of a template.

Action 1214 is selectively masking, or exposing portions of the business profile as a function of respective entity access. Information included in the business profile can be designated for limited distribution. For instance, it is unlikely that medial history data for an employee is to be disseminated to other co-workers. Therefore, portions of a business profile can be blocked if a person does not have proper entity access or exposed if a person does have sufficient entity access.

For purposes of simplicity of explanation, methodologies that can be implemented in accordance with the disclosed subject matter were shown and described as a series of blocks. However, it is to be understood and appreciated that the claimed subject matter is not limited by the order of the blocks, as some blocks can occur in different orders and/or concurrently with other blocks from what is depicted and described herein. Moreover, not all illustrated blocks can be required to implement the methodologies described hereinafter. It should be further appreciated that the methodologies disclosed throughout this specification are capable of being stored on an article of manufacture to facilitate transporting and transferring such methodologies to computers. The term article of manufacture, as used, is intended to encompass a computer program accessible from any computer-readable device, carrier, or media.

Figure 13:
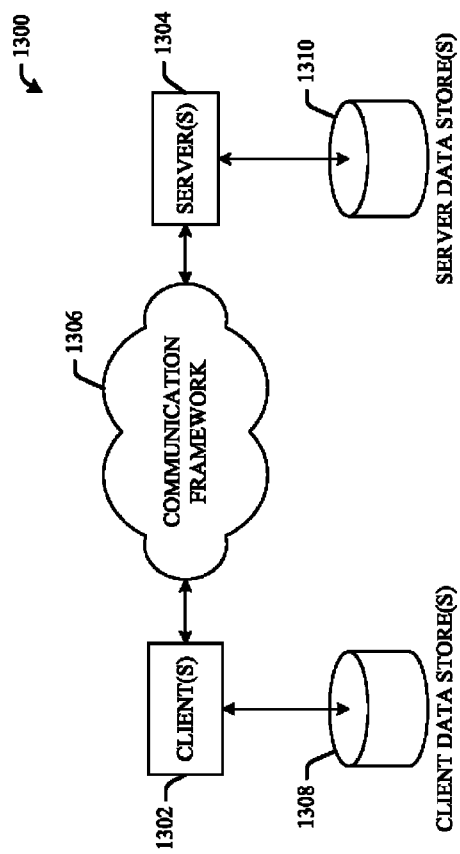
FIG. 13 illustrates an example of a schematic block diagram of a computing environment in accordance with the subject specification.
Figure 14:
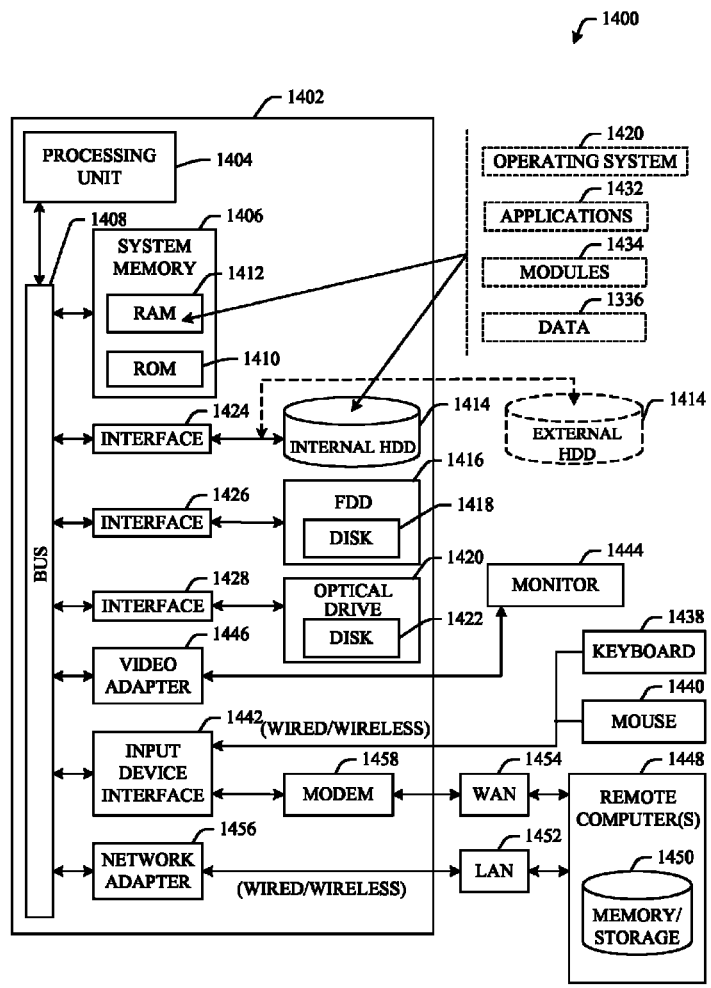
FIG. 14 illustrates an example of a block diagram of a computer operable to execute the disclosed architecture.

In order to provide a context for the various aspects of the disclosed subject matter, FIGS. 13 and 14 as well as the following discussion are intended to provide a brief, general description of a suitable environment in which the various aspects of the disclosed subject matter can be implemented. While the subject matter has been described above in the general context of computer-executable instructions of a program that runs on one or more computers, those skilled in the art will recognize that the subject matter described herein also can be implemented in combination with other program modules. Generally, program modules include routines, programs, components, data structures, etc. that perform particular tasks and/or implement particular abstract data types. Moreover, those skilled in the art will appreciate that the inventive methods can be practiced with other computer system configurations, including single-processor, multiprocessor or multi-core processor computer systems, mini-computing devices, mainframe computers, as well as personal computers, hand-held computing devices (e.g., personal digital assistant (PDA), phone, watch . . . ), microprocessor-based or programmable consumer or industrial electronics, and the like. The illustrated aspects can also be practiced in distributed computing environments where tasks are performed by remote processing devices that are linked through a communications network. However, some, if not all aspects of the claimed subject matter can be practiced on stand-alone computers. In a distributed computing environment, program modules can be located in both local and remote memory storage devices.

Referring now to FIG. 13, there is illustrated a schematic block diagram of a computing environment 1300 in accordance with the subject specification. The system 1300 includes one or more client(s) 1302. The client(s) 1302 can be hardware and/or software (e.g., threads, processes, computing devices). The client(s) 1302 can house cookie(s) and/or associated contextual information by employing the specification, for example.

The system 1300 also includes one or more server(s) 1304. The server(s) 1304 can also be hardware and/or software (e.g., threads, processes, computing devices). The servers 1304 can house threads to perform transformations by employing the specification, for example. One possible communication between a client 1302 and a server 1304 can be in the form of a data packet adapted to be transmitted between two or more computer processes. The data packet can include a cookie and/or associated contextual information, for example. The system 1300 includes a communication framework 1306 (e.g., a global communication network such as the Internet) that can be employed to facilitate communications between the client(s) 1302 and the server(s) 1304.

Communications can be facilitated via a wired (including optical fiber) and/or wireless technology. The client(s) 1302 are operatively connected to one or more client data store(s) 1308 that can be employed to store information local to the client(s) 1302 (e.g., cookie(s) and/or associated contextual information). Similarly, the server(s) 1304 are operatively connected to one or more server data store(s) 1310 that can be employed to store information local to the servers 1304.

Referring now to FIG. 14, there is illustrated a block diagram of a computer operable to execute the disclosed architecture. In order to provide additional context for various aspects of the subject specification, FIG. 14 and the following discussion are intended to provide a brief, general description of a suitable computing environment 1400 in which the various aspects of the specification can be implemented. While the specification has been described above in the general context of computer-executable instructions that can run on one or more computers, those skilled in the art will recognize that the specification also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the specification can also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer-readable media can comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or any other medium which can be used to store the desired information and which can be accessed by the computer.

Communication media typically embody computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared and other wireless media. Combinations of the any of the above should also be included within the scope of computer-readable media.

With reference again to FIG. 14, the example environment 1400 for implementing various aspects of the specification includes a computer 1402, the computer 1402 including a processing unit 1404, a system memory 1406 and a system bus 1408. The system bus 1408 couples system components including, but not limited to, the system memory 1406 to the processing unit 1404. The processing unit 1404 can be any of various commercially available processors or proprietary specific configured processors. Dual microprocessors and other multi-processor architectures can also be employed as the processing unit 1404.

The system bus 1408 can be any of several types of bus structure that can further interconnect to a memory bus (with or without a memory controller), a peripheral bus, and a local bus using any of a variety of commercially available bus architectures. The system memory 1406 includes read-only memory (ROM) 1410 and random access memory (RAM) 1412. A basic input/output system (BIOS) is stored in a non-volatile memory 1410 such as ROM, EPROM, EEPROM, which BIOS contains the basic routines that help to transfer information between elements within the computer 1402, such as during start-up. The RAM 1412 can also include a high-speed RAM such as static RAM for caching data.

The computer 1402 further includes an internal hard disk drive (HDD) 1414 (e.g., EIDE, SATA), which internal hard disk drive 1414 can also be configured for external use in a suitable chassis (not shown), a magnetic floppy disk drive (FDD) 1416, (e.g., to read from or write to a removable diskette 1418) and an optical disk drive 1420, (e.g., reading a CD-ROM disk 1422 or, to read from or write to other high capacity optical media such as the DVD). The hard disk drive 1414, magnetic disk drive 1416 and optical disk drive 1420 can be connected to the system bus 1408 by a hard disk drive interface 1424, a magnetic disk drive interface 1426 and an optical drive interface 1428, respectively. The interface 1424 for external drive implementations includes at least one or both of Universal Serial Bus (USB) and IEEE 1394 interface technologies. Other external drive connection technologies are within contemplation of the subject specification.

The drives and their associated computer-readable media provide nonvolatile storage of data, data structures, computer-executable instructions, and so forth. For the computer 1402, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, can also be used in the example operating environment, and further, that any such media can contain computer-executable instructions for performing the methods of the specification.

A number of program modules can be stored in the drives and RAM 1412, including an operating system 1430, one or more application programs 1432, other program modules 1434 and program data 1436. All or portions of the operating system, applications, modules, and/or data can also be cached in the RAM 1412. It is appreciated that the specification can be implemented with various proprietary or commercially available operating systems or combinations of operating systems.

A user can enter commands and information into the computer 1402 through one or more wired/wireless input devices, e.g., a keyboard 1438 and a pointing device, such as a mouse 1440. Other input devices (not shown) can include a microphone, an IR remote control, a joystick, a game pad, a stylus pen, touch screen, or the like. These and other input devices are often connected to the processing unit 1404 through an input device interface 1442 that is coupled to the system bus 1408, but can be connected by other interfaces, such as a parallel port, an IEEE 1394 serial port, a game port, a USB port, an IR interface, etc.

A monitor 1444 or other type of display device is also connected to the system bus 1408 via an interface, such as a video adapter 1446. In addition to the monitor 1444, a computer typically includes other peripheral output devices (not shown), such as speakers, printers, etc.

The computer 1402 can operate in a networked environment using logical connections via wired and/or wireless communications to one or more remote computers, such as a remote computer(s) 1448. The remote computer(s) 1448 can be a workstation, a server computer, a router, a personal computer, portable computer, microprocessor-based entertainment appliance, a peer device or other common network node, and typically includes many or all of the elements described relative to the computer 1402, although, for purposes of brevity, only a memory/storage device 1450 is illustrated. The logical connections depicted include wired/wireless connectivity to a local area network (LAN) 1452 and/or larger networks, e.g., a wide area network (WAN) 1454. Such LAN and WAN networking environments are commonplace in offices and companies, and facilitate enterprise-wide computer networks, such as intranets, all of which can connect to a global communications network, e.g., the Internet.

When used in a LAN networking environment, the computer 1402 is connected to the local network 1452 through a wired and/or wireless communication network interface or adapter 1456. The adapter 1456 can facilitate wired or wireless communication to the LAN 1452, which can also include a wireless access point disposed thereon for communicating with the wireless adapter 1456.

When used in a WAN networking environment, the computer 1402 can include a modem 1458, or is connected to a communications server on the WAN 1454, or has other means for establishing communications over the WAN 1454, such as by way of the Internet. The modem 1458, which can be internal or external and a wired or wireless device, is connected to the system bus 1408 via the input device interface 1442. In a networked environment, program modules depicted relative to the computer 1402, or portions thereof, can be stored in the remote memory/storage device 1450. It will be appreciated that the network connections shown are example and other means of establishing a communications link between the computers can be used.

The computer 1402 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11(a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10 BaseT wired Ethernet networks used in many offices.

The aforementioned systems have been described with respect to interaction among several components. It should be appreciated that such systems and components can include those components or sub-components specified therein, some of the specified components or sub-components, and/or additional components. Sub-components can also be implemented as components communicatively coupled to other components rather than included within parent components. Additionally, it should be noted that one or more components could be combined into a single component providing aggregate functionality. The components could also interact with one or more other components not specifically described herein but known by those of skill in the art.

What has been described above includes examples of the subject specification. It is, of course, not possible to describe every conceivable combination of components or methodologies for purposes of describing the subject specification, but one of ordinary skill in the art can recognize that many further combinations and permutations of the subject specification are possible. Accordingly, the subject specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising:
memory having stored therein computer executable components; and a processor that executes the computer executable components that comprise:
a search component that gathers data regarding a plurality of individuals that have capability of working on a team protect;
a personnel component that identifies from the gathered data at least two individuals from the plurality of individuals having particular characteristics of interest;
a build component that creates a team of individuals respectively possessing desired characteristics as a function of member availability to work on the team project, the team of individuals including the two individuals;
an analysis component that analyzes the gathered data and employs a subset of the gathered data in connection with generating a workstation business profile of the team for an individual, the workstation business profile improving an operation of an employment or business relationship by allowing multiple members of the team that work on the team project to share information relating to the team project, the workstation business profile organizing at least two pieces of information into a construct where the organized pieces of information relate to the individual and the team;
a decision component that determines at least part of a communication between the two individuals of the team is beneficial to the individual, the communication including an instant message conversation between the two individuals of the team, the two individuals being distinct from the individual;
a security unit that evaluates sensitivity of the gathered data at least partly based on confidentiality of contents of the gathered data and an access right of the individual to access the gathered data, and selectively masks or exposes a portion or all of the communication at least based on the access right of the individual; and
an update component that presents at least the portion of the communication at the workstation business profile.

2. The system of claim 1, wherein the workstation business profile is segmented into topical or source-specific areas.

3. The system of claim 1, wherein the build component creates the team based on a time availability to work on the project.

4. The system of claim 1, wherein the decision component selects the gathered data for association into the workstation business profile.

5. The system of claim 1, wherein the security unit enforces one or more security policies in connection with data access or dissemination.

6. The system of claim 1, further comprising an artificial intelligence component that makes at least one inference or at least one determination in relation to the gathered data, the generation of workstation business profile, or a combination thereof.

7. The system of claim 1, wherein the update component modifies the workstation business profile in accordance with a contextual change.

8. The system of claim 1, further comprising an alteration component that modifies format of at least part of the gathered data.

9. The system of claim 1, further comprising an input component that receives parameters used in the generation of the workstation business profile.

10. The system of claim 1, further comprising a breakdown component that collapses at least part of the gathered data into a conversation unit.

11. The system of claim 1, further comprising an error component that processes at least one fault related to the workstation business profile.

12. The system of claim 1, further comprising a situation component that determines at least one presentation construct associated with the workstation business profile.

13. A method for enriching business communication performed by a processor executing computer-executable instructions stored on memory, the method comprising:
gathering data regarding a plurality of individuals that have capability of working on a team project;
identifying from the gathered data at least two individuals from the plurality of individuals having particular characteristics of interest;
creating a team of individuals respectively possessing desired characteristics as a function of member availability to work on the team project, the team of individuals including the two individuals;
analyzing the gathered data and employing a subset of the gathered data in connection with generating a workstation business profile of the team for an individual, the workstation business profile improving an operation of an employment or business relationship by allowing multiple members of the team that work on the team project to share information relating to the team project, the workstation business profile organizing at least two pieces of information into a construct where the organized pieces of information relate to the individual and the team;
determining at least part of a communication between the two individuals of the team is beneficial to the individual, the communication including an instant message conversation between the two individuals of the team, the two individuals being distinct from the individual;
evaluating sensitivity of the gathered data at least partly based on confidentiality of contents of the gathered data and an access right of the individual to access the gathered data;
selectively masking or exposing a portion or all of the communication at least based on the access right of the individual; and
presenting at least the portion of the communication at the workstation business profile.

14. The method of claim 13, wherein the gathering data comprises conducting a search across one or more sources to gather information relating to the individual in a business context, the one or more sources including an internet, an intranet, or a local storage.

15. The method of claim 14, wherein the information includes an instant message, an email, an entry log, or a document.

16. The method of claim 14, further comprising limiting the search to a subset of the one or more data sources as a function of a security policy or a user preference.

17. The method of claim 13, further comprising identifying at least two relationships of different types between the individual and one or more other individuals, the at least two relationships being included in the workstation business profile.

18. Memory having computer-executable instructions encoded thereon that upon execution configure a computer to perform operations comprising:
gathering data regarding a plurality of individuals that have capability of working on a team project;
identifying from the gathered data at least two individuals from the plurality of individuals having particular characteristics of interest;
creating a team of individuals respectively possessing desired characteristics as a function of member availability to work on the team project, the team of individuals including the two individuals;
analyzing the gathered data and employing a subset of the gathered data in connection with generating a workstation business profile of the team for an individual, the workstation business profile improving an operation of an employment or business relationship by allowing multiple members of the team that work on the team project to share information relating to the team project, the workstation business profile organizing at least two pieces of information into a construct where the organized pieces of information relate to the individual and the team;
determining at least part of a communication between the two individuals of the team is beneficial to the individual, the communication including an instant message conversation between the two individuals of the team, the two individuals being distinct from the individual;
evaluating sensitivity of the gathered data at least partly based on confidentiality of contents of the gathered data and an access right of the individual to access the gathered data;
selectively masking or exposing a portion or all of the communication at least based on the access right of the individual; and
presenting at least the portion of the communication at the workstation business profile.

19. The memory of claim 18, wherein the gathering data comprises conducting a search across one or more sources to gather information relating to the individual in a business context, the one or more sources including an internet, an intranet, or a local storage, the information including an instant message, an email, an entry log, or a document.

20. The system of claim 1, wherein the search component searches across one or more sources to gather information relating to the individual in a business context, the one or more sources including an internet, an intranet, or a local storage, the information including an instant message, an email, an entry log, or a document.

* * * * *